United States Defensive Publication [19] (H) [11] T105,002

Aviram et al. [43] Jan. 1, 1985

[54] EROSION PROCESS FOR GENERATION OF OFFSET MASTERS

[76] Inventors: Ari Aviram, 265 Prince Ct., Yorktown Heights, N.Y. 10598; John G. Cahill, Box 29A, Rte. 2, Richmond, Vt. 05477; Peter S. Hauge, 382 Alden Rd., Yorktown Heights, N.Y. 10598; Keith S. Pennington, Londonderry La., Somers, N.Y. 10589

[21] Appl. No.: 588,472

[22] Filed: Apr. 20, 1984

Related U.S. Application Data

[63] Continuation of Ser. No. 324,495, Nov. 24, 1981, abandoned, which is a continuation of Ser. No. 103,965, Dec. 17, 1979, abandoned.

[51] Int. Cl.[3] ..... B41N 1/08

[52] U.S. Cl. ..... 101/459; 346/163

[57] ABSTRACT

An improved lithographic printing plate includes a substrate layer of a nonconducting, hydrophobic polyester, an intermediate film of conducting, hydrophilic material such as aluminum and a top protective film of relatively hard hydrophilic dielectric material, such as aluminum oxide. A printing image is formed in the lithographic printing plate by an electroerosion process wherein erosion electrodes are pulsed with voltage to break down the dielectric in areas adjacent to the erosion electrodes and to evaporate or otherwise remove corresponding portions of the conducting film, thereby creating holes that extend through the dielectric and conducting films and that expose portions of the surface of the underlying hydrophobic substrate.

13 Claims, 1 Sheet Drawing,

17 Pages Specification

The file of this unexamined application may be inspected and copies thereof may be purchased (849 O.G. 1221, Apr. 9, 1968).

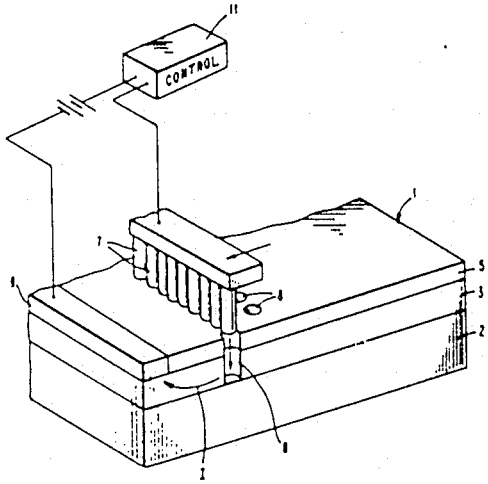

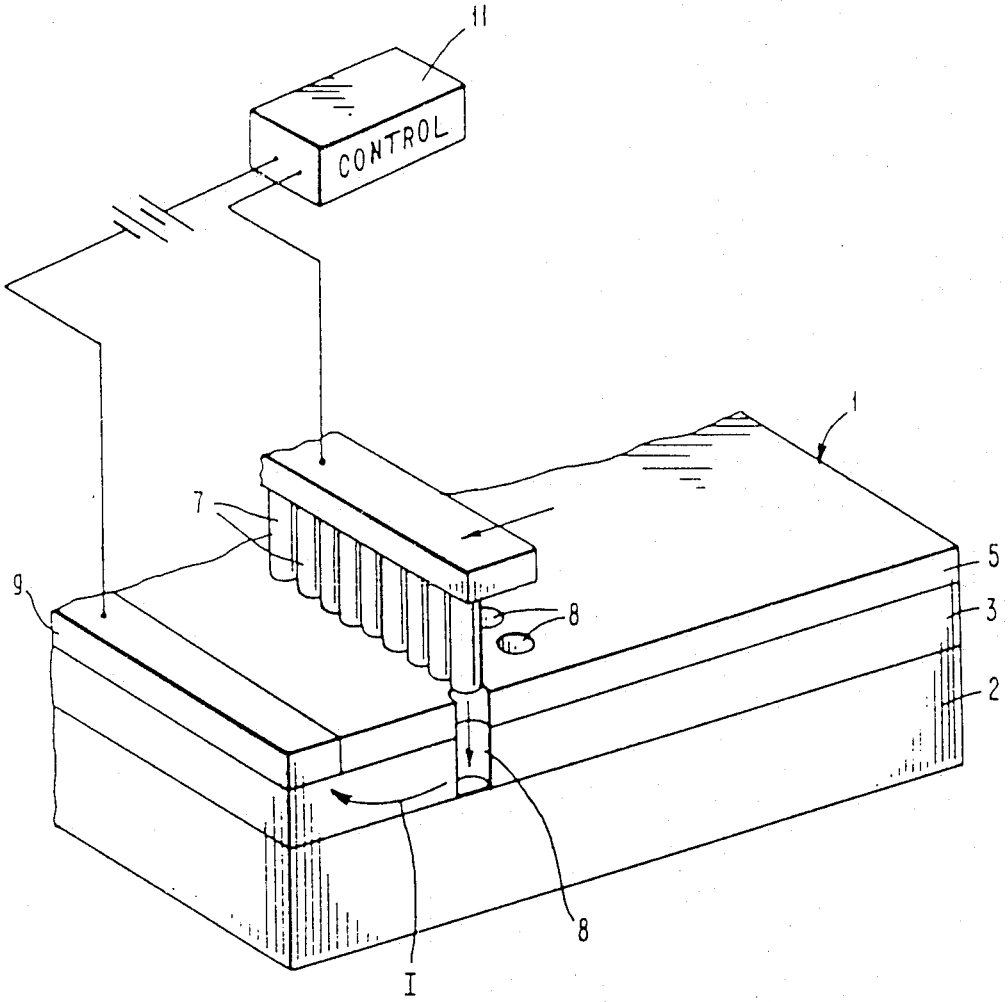
11
CONTROL
1
7
9
5
3
2
8
8
I